United States Patent Office 2,716,664
Patented Aug. 30, 1955

2,716,664
REMOVAL OF SELENIUM IN ALDEHYDE MANUFACTURE

David James Hadley, Epsom Downs, and Robert Heap, Sutton, England, assignors to The Distillers Company Limited, Edinburgh, Scotland, a British company No Drawing. Application June 15, 1950,
Serial No. 168,378

Claims priority, application Great Britain July 14, 1949

3 Claims. (Cl. 260—604)

The present invention relates to the removal of selenium from gas mixtures, in particular gas mixtures derived from the oxidation of olefines such as propylene and isobutene to the corresponding unsaturated aldehydes, for instance acrolein and methacrolein in the presence of a catalyst comprising selenium.

When such olefinic compounds in admixture with molecular oxygen-containing gases and in the presence in the reaction zone of elementary selenium are passed at elevated temperatures over a contact material which comprises copper compounds such as copper oxide, copper aluminate, copper silicate or compounds of heavy metals such as vanadium, manganese, chromium, molybdenum, and the like, as described in our copending application Ser. No. 142,706, filed February 6, 1950, so that the olefinic compounds are oxidised to unsaturated aldehyde the gas mixture issuing from the reactor contains combined and elementary selenium in addition to the reaction products and unconverted olefinic compounds. Part of this selenium is deposited on cooling the gaseous reaction mixture, but a further part passes through the said deposition zone. This latter part, which may amount to about 2 to 3% of the selenium initially fed or present in the reaction zone, passes on with the gas stream to the wash towers wherein the aldehydes produced by the oxidation reaction are washed out by suitable solvents, such as water. The gases leaving the towers, however, contain appreciable amounts of the selenium compounds in vapour form and perhaps also finely dispersed selenium which elude removal by the solvents used in the towers. Because of its highly toxic nature the practically complete removal of the selenium before the gases are ultimately discharged into the air is imperative. This applies also to the process when carried out in a continuous manner wherein a part of the gaseous reaction mixture coming from the reactor is treated for the recovery of the unsaturated aldehyde produced and then vented into the atmosphere whilst the other part is recycled through the reaction zone after the vented part has been replaced by fresh olefine and oxidizing gas. Attempts to remove the selenium from the gas mixture by the use of solvents or by bringing it in contact with chemical agents such as NaOH, HCl, H₂SO₄, chromic acid and sodium hypochlorite were unsuccessful. It can be removed by washing with chlorine water but this is a very expensive process. Attempts were also made to remove the residual finely divided selenium by means of such adsorbents as activated alumina or silica gel, but these proved to be of little practical use. Although these materials adsorbed small quantities of the selenium a break-through occurred after a very short time, even when relatively large quantities of these adsorbents were used.

It has now been found that gas adsorption charcoal removes the selenium practically completely from the gas mixture, and that such charcoal will adsorb as much as several percent of its own weight.

The present invention, therefore, comprises conducting the selenium-containing gas mixtures resulting from the production of unsaturated aldehydes such as acrolein and methacrolein by the oxidation of propylene or isobutene respectively, in the presence in the reaction zone of elementary selenium and contact materials containing copper or other heavy metals over gas adsorption charcoal before being released to the atmosphere.

In order to prevent premature exhaustion of the charcoal it is preferred to reduce the selenium content of the gas mixture before its passage over the charcoal as much as possible by other methods, such as cooling the gas mixture whereby the deposition of the greatest part of the selenium, generally in a crystalline form, is effected.

It has further been found that the adsorption of the selenium by the charcoal can be considerably improved by preventing the deposition on the charcoal of liquid water from the wet gas mixture. This can be achieved, for instance by slightly warming the adsorption charcoal above the temperature of the entering gas, for instance to 30° C., when the entering gas is 15° C. It is an important feature that the temperature of the charcoal adsorbent is sufficiently high so as to exclude any condensation or precipitation thereon of water from the gas. In this way it is possible to load the charcoal with several per cent of its weight of selenium before the equilibrium between the solid and gas phases is reached. Good efficiency of the adsorption is obtained if substantially all the unsaturated aldehyde is removed from the gas mixture before it comes into contact with the adsorbing medium.

Developments of the process to make the greatest use of the charcoal are, for instance, the connection of several beds of carbon in series and the removal of the one on the high concentration side when it becomes saturated with selenium while a fresh bed is connected on to the outlet end.

The selenium adsorbed by the charcoal may be recovered therefrom, for instance by heating to elevated temperatures thereby vaporising the selenium which is subsequently easily and practically completely condensed, or by converting it into a soluble compound and dissolving said compound by a suitable solvent, for instance by treatment with chlorine in the presence of steam and subsequent washing with water. This last method is especially useful when the charcoal has been only partly charged with selenium.

An advantageous way of making use of the selenium charged upon the activated carbon comprises passing the mixture of the reactant olefine and molecular oxygen prior to its introduction into the reactor over the charged charcoal at elevated temperatures whereby the selenium is removed therefrom and the gas mixture provided with the elementary selenium which in conjunction with the heavy metal contact material effects the conversion of the olefine into the unsaturated aldehyde.

The following example illustrates the manner in which the process of the invention may be carried out in practice:

Example 1

25 litres of air per hour was conducted over a selenium reservoir at 320° C. The gas then contained 0.001 gram of selenium per litre. It was first passed through an empty reactor at the same temperature, and finally through a water washtower. Substantially all of the selenium condensed in the cold outlet from the reactor and the gas leaving the tower contained less than $1 \times 10^{-6}$ gram of selenium per litre after 1, 4 and 25 hours from the start of the experiment. The same result was obtained when 2% of propylene was added to the air.

When the experiment was repeated with 8 grams of copper-alumina catalyst in the reactor, the gas from the washtower contained $14 \times 10^{-6}$ grams of selenium per litre of gas mixture 25 hours from the start of the run.

The gas mixture issuing from the reactor tube was then passed into a tube charged with 6 gms. gas adsorption charcoal. After the passage through said tube the gas was completely free from selenium until the charcoal had adsorbed more than 1% of its weight of selenium.

Comparative tests were carried out on the three adsorbents: activated carbon, silica gel, and activated alumina, which show the great superiority of the carbon.

10 grams of 8–16 mesh adsorbent was placed in a 1 cm. bore glass tube which was heated to about 30° C. by a spiral of resistance wire wound on the outside.

Propylene was oxidised with air to which 0.001 gram of selenium per litre in the form of vapour had been added. The gas mixture which contained 2% propylene was passed at about 320° C. over 8 grams of a copper-alumina catalyst in a reactor tube at a rate of 25 litres per hour. Selenium and selenium dioxide were deposited in the outlet of the reactor. The gas mixture issuing from the reactor tube after having been washed free of acrolein, and thereby being cooled incidentally to about 15° C., was passed through the adsorbent. The gas entering the adsorbent contained approximately 15 to 20 millionths of a gram of selenium per litre. After 20 hours the selenium was estimated in the gas leaving the adsorbent.

| Adsorbent | Selenium content of gas leaving adsorbent after 20 hours in millionths of a gm./litre |
| --- | --- |
| Silica Gel | 13 |
| Activated Alumina | 9 |
| Activated coconut charcoal | <1 |

There was no appreciable increase in the selenium content of the gas leaving the charcoal until it had been in use about 550 hours.

*Example 2*

98,100 litres per hour of a gas consisting of 2% v./v. propylene in air was loaded with 0.001 selenium gram per litre and passed over 8.1 kg. of copper-alumina catalyst at a mean temperature of 340° C. The bulk of the selenium was removed from the gas stream leaving the reactor by causing it to impinge on a cool surface. The gas was then washed substantially free of acrolein by a countercurrent stream of water at about 15° C. after which it was warmed to 30° C. and was finally passed through two selenium traps in series before being vented to the atmosphere. Each trap was 20 cm. diameter and 55 cm. long and contained 6.3 kg. of activated charcoal.

The gas entering the first trap contained on the average $25 \times 10^{-6}$ grams/litre of selenium.

During about 90 days on stream the selenium content of the gas leaving the first trap was between 1 and $4 \times 10^{-6}$ grams per litre while that of the gas leaving the second trap was $<1 \times 10^{-6}$ grams per litre. There was then a slow decline in the adsorption efficiency, and on the 111th day, when the run was stopped, the gas between the two traps contained $10 \times 10^{-6}$ grams selenium per litre and that leaving the second contained $3 \times 10^{-6}$ grams selenium per litre.

The average selenium loading of the carbon in the first trap was 8.1% w./w., by analytical determination.

We claim:

1. In a process for the manufacture of unsaturated aldehydes by the oxidation of olefines with molecular oxygen over heavy metal catalysts in the presence in the reaction zone of elementary selenium, the steps of cooling the gaseous reaction mixture issuing from the reactor whereby deposition and removal of selenium and selenium compounds contained in such mixture is effected, and then conducting the thus-cooled gaseous reaction mixture over gas adsorption charcoal before its gaseous mixture is released to the atmosphere, whereby residual selenium and selenium compounds are removed from said mixture.

2. In a process as claimed in claim 1, the further feature of heating the gas adsorption charcoal to and maintaining it at a temperature only sufficiently high to prevent condensation of water thereon.

3. In a process as claimed in claim 1, the further step of removing unsaturated aldehyde from said gaseous reaction mixture by washing with water before said mixture is passed over the gas adsorption charcoal.

References Cited in the file of this patent

UNITED STATES PATENTS

| | | |
| --- | --- | --- |
| 2,383,711 | Clark et al. | Aug. 28, 1945 |
| 2,413,374 | Phillips et al. | Dec. 31, 1946 |
| 2,593,437 | Goodings et al. | Apr. 22, 1952 |
| 2,645,664 | Hadley et al. | July 14, 1953 |

FOREIGN PATENTS

| | | |
| --- | --- | --- |
| 376,306 | Great Britain | July 8, 1932 |
| 625,330 | Great Britain | June 27, 1949 |

OTHER REFERENCES

Mellor: Comprehensive Treatise, vol. 10, Longmans, Green and Co., New York, 1930.

Mantell: "Adsorption," pp. 148–165 (1945), McGraw-Hill Book Co. Inc., New York, N. Y.